United States Patent [19]
Takeda

[11] Patent Number: 4,970,530

[45] Date of Patent: Nov. 13, 1990

[54] THERMAL HEAD

[75] Inventor: Yusuke Takeda, Yokohama, Japan

[73] Assignee: Ricoh Company, Ltd., Tokyo, Japan

[21] Appl. No.: 476,174

[22] Filed: Feb. 7, 1990

[30] Foreign Application Priority Data

Feb. 16, 1989 [JP] Japan .................................. 1-37079

[51] Int. Cl.$^5$ .............................................. G01D 15/10

[52] U.S. Cl. ................................ 346/76 PH; 219/216

[58] Field of Search ............. 219/216 PH; 346/76 PH

[56] References Cited

FOREIGN PATENT DOCUMENTS 0162369 7/1986 Japan ............................ 219/216 PH 0164854 7/1986 Japan ............................ 219/216 PH 0171365 8/1986 Japan ............................ 219/216 PH

*Primary Examiner*—Bruce A. Reynolds

*Assistant Examiner*—Huan Tran

*Attorney, Agent, or Firm*—Cooper & Dunham

[57] ABSTRACT

A thermal head is arranged in a printing device so as to be opposite to a printed object fed in a constant direction. The thermal head comprises a base member; a plurality of heating resistors arranged in the base member; electrodes disposed in the base member corresponding to the heating resistors; and a slit formed on a surface of the heating resistors and having a shape in which the width of the slit in a feeding direction of the printed object is less than that in an arranging direction of the heating resistors perpendicular to the feeding direction and the width of the slit in the arranging direction of the heating resistors is approximately equal to a half length of a pitch of the heating resistors in the arranging direction thereof. The accuracy in circularity of dots is improved by satisfying a condition that the width of the slit in the feeding direction of the printed object is less than that in the arranging direction of the heating resistors perpendicular to the feeding direction. The generation of irregular density is restrained by satisfying a condition that the width of the slit in the direction perpendicular to the feeding direction of the printed object is approximately equal to the half length of the pitch of the heating resistors in this perpendicular direction.

3 Claims, 2 Drawing Sheets

THERMAL HEAD

BACKGROUND OF THE INVENTION

1. Field of the Invention

The present invention relates to a thermal head used in a facsimile, various kinds of printers, a plotter, a printing device in a computer terminal, etc. in a thermo-sensible recording system or a thermal transfer recording system.

2. Description of the Related Art

In the thermal head of this kind, a plurality of heating resistors and electrodes corresponding to these heating resistors are disposed in a base member to selectively heat the heating resistors by providing a signal to the electrodes. A portion of a printing medium coated on a surface of a printed object is melted or sublimed by the heat of the heating resistors to perform a transferring operation by forming dots on the printed object.

Further, as shown in e.g., Japanese Patent Application Laying Open (KOKAI) No. 53-87240, etc., a slit is formed in a portion of the heating resistors to reliably form the dots. In this case, a heating amount is locally increased in the vicinity of four corners of the slit so that a portion of the printing medium approximately opposite to the four corners of the slit is first melted or sublimed and is widened in a radial shape, thereby printing one dot.

In the structure for forming the slit in the heating resistors, a large heating amount is locally obtained so that the accuracy in formation of the dots can be improved by melting or subliming the printing medium. However, the accuracy in circularity of the dots is reduced and density becomes irregular so that the quality of an image is reduced.

The shape of the slit gives a great influence to the accuracy in circularity of the obtained dots and the generation of the irregular density. In the structure mentioned above, since the slit is simply formed to locally obtain heat, it is not possible to take measures with respect to the reduction of the accuracy in circularity of the dots and the irregular density.

SUMMARY OF THE INVENTION

It is therefore an object of the present invention to provide a thermal head for improving the circularity of a printed dot and the quality of a printed image.

The above object of the present invention can be achieved by a thermal head arranged in a printing device so as to be opposite to a printed object fed in a constant direction, the thermal head comprising a base member; a plurality of heating resistors arranged in the base member; electrodes disposed in the base member corresponding to the heating resistors; and a slit formed on a surface of the heating resistors and having a shape in which the width of the slit in a feeding direction of the printed object is less than that in an arranging direction of the heating resistors perpendicular to the feeding direction and the width of the slit in the arranging direction of the heating resistors is approximately equal to a half length of a pitch of the heating resistors in the arranging direction thereof.

In accordance with the present invention, with respect to the shape of the slit formed in the heating resistors, the accuracy in circularity of dots is improved by satisfying a condition that the width of the slit in the feeding direction of the printed object is less than that in the arranging direction of the heating resistors perpendicular to the feeding direction. The generation of irregular density is restrained by satisfying a condition that the width of the slit in the direction perpendicular to the feeding direction of the printed object is approximately equal to the half length of the pitch of the heating resistors in this perpendicular direction.

Further objects and advantages of the present invention will be apparent from the following description of the preferred embodiments of the present invention as illustrated in the accompanying drawings.

DESCRIPTION OF THE PREFERRED EMBODIMENTS

The preferred embodiments of a thermal head in the present invention will next be described in detail with reference to the accompanying drawings.

In a premise in which the accuracy in circularity of dots is reduced and density becomes irregular by the shape of a slit, the experimental results with respect to the change in shape of the slit are obtained as follows.

Figure 1A:
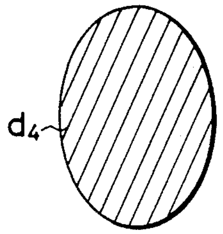
FIGS. 1 and 2 show printed states of dots in a thermal head.
Figure 1B:
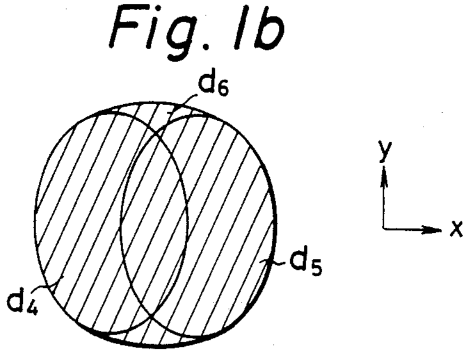

In FIGS. 1*a* and 1*b*, a feeding direction of a printed object is designated by reference numeral y and an arranging direction of heating resistors and perpendicular to the feeding direction of the printed object is designated by reference numeral x. When the width of the slit in the y direction is wider than that in the x direction, as shown in FIG. 1*a*, an obtained dot $d_4$ is formed in an elliptical shape having a major axis in the y direction so that the image quality is deteriorated. FIG. 1*b* shows printed dots $d_4$ and $d_5$ adjacent to each other and a dot $d_6$ is formed in an elliptical shape having a low circularity as a whole.

Figure 2A:
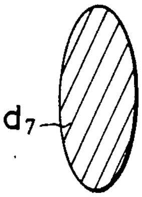
Figure 2B:
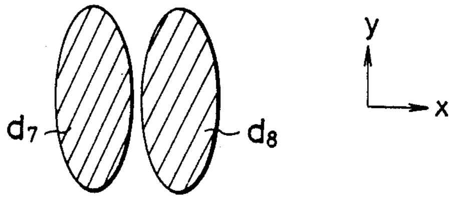

In FIGS. 2*a* and 2*b*, the width of the slit in the x direction is shorter than a half length of a pitch of the heating resistors in the x direction. In this case, as shown in FIG. 2*a*, an obtained dot $d_7$ has a major axis in the y direction and has a short minor axis so that this dot has an elliptical shape having a very low circularity. When dots $d_7$ and $d_8$ adjacent to each other are printed, as shown in FIG. 2*b*, temperature is reduced between the dots $d_7$ and $d_8$ so that a blank portion and a portion having a low density are caused in the dots even when the entire dots are printed.

When the width of the slit in the x direction is larger than the half length of the pitch of the heating resistors in the x direction, the density of one dot in a central portion thereof is reduced so that the density becomes irregular although this case is not illustrated.

Figure 3:
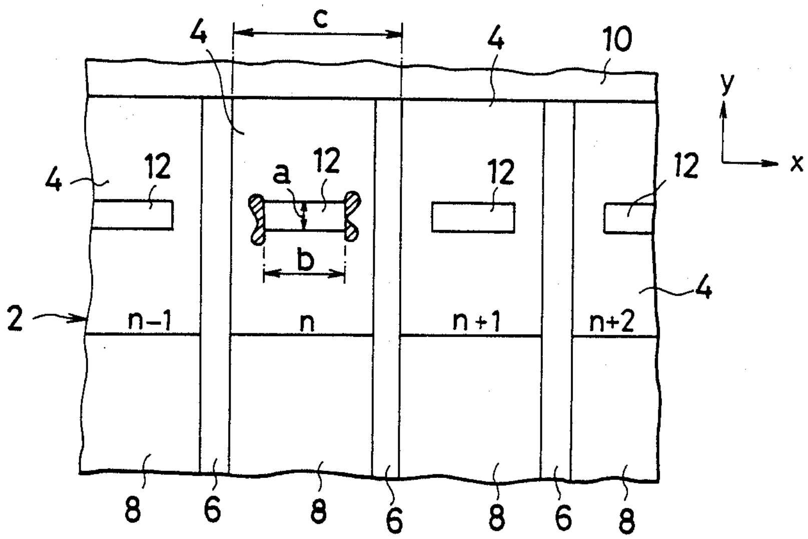
FIG. 3 is a plan view of a main portion of a thermal head in accordance with one embodiment of the present invention.
Figure 4:
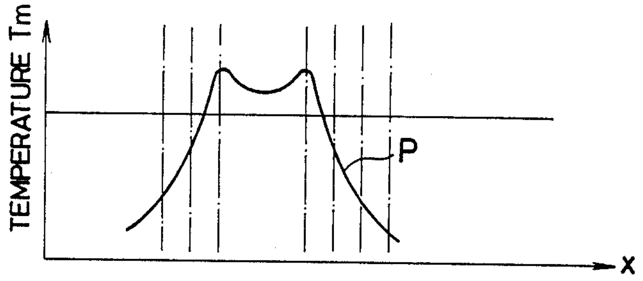
FIG. 4 is a graph showing a distribution of temperature in the thermal head when an electric current flows through one of heating resistors.

FIGS. 3 and 4 show a thermal head in one embodiment of the present invention.

In these figures, a feeding direction of a printed object such as a thermosensible sheet is designated by reference numeral y and a direction perpendicular to the feeding direction of the printed object is designated by reference numeral x. A plurality of heating resistors 4 made of $Ta_2N$, $TaSiO_2$, etc. are arranged in a line in the x direction through an insulator 6 in a base member 2 formed by an insulating substrate. Electrodes 8 corresponding to the respective heating resistors 4 are disposed and a common electrode 10 is disposed.

A slit 12 having a rectangular opening face is formed in a central surface portion of each of the heating resistors 4. A width a of each slit 12 in the y direction is less than a width b thereof in the x direction as the arranging direction of the heating resistors 4 and the width b is approximately equal to a half length of a pitch c of the heating resistors 4.

When an electric current flows through an n-th heating resistor 4 for example, as shown by hatching in FIG. 3, the heating amount of a corner portion of the slit 12 in the vicinity of four corners thereof is increased in comparison with that of a peripheral portion thereof. Therefore, a printing medium of the printed object located just below the corner portion of the slit 12 is melted or sublimed and is widened in a radial direction so that one dot is formed on the printed object.

As shown in FIG. 4, when the electric current flows through the n-th heating resistor 4, a distribution of temperature thereof is shown as curve P having projected portions corresponding to the four corners of the slit 12. A curve portion exceeding a temperature for starting a transferring operation shown by reference numeral Tm is a temperature distributing region for forming the dots.

Figure 5:
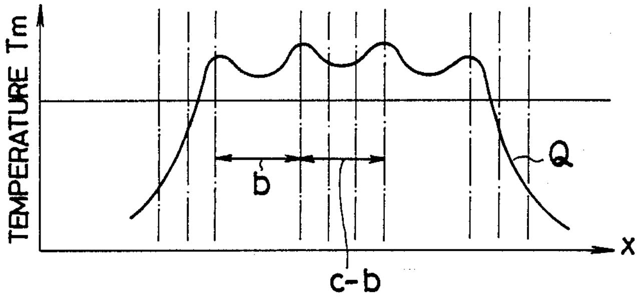
FIG. 5 is a graph showing a distribution of temperature in the thermal head when an electric current flows through two heating resistors adjacent to each other.

FIG. 5 shows a temperature distribution when an electric current flows through the n-th and (n+1)-th heating resistors 4. In this case, curve Q also has projected portions corresponding to the four corners of the slit 12. Similar to FIG. 4, a curve portion exceeding a temperature for starting the transferring operation shown by reference numeral Tm is a temperature distributing region for forming the dots.

Figures 6A, 6B:
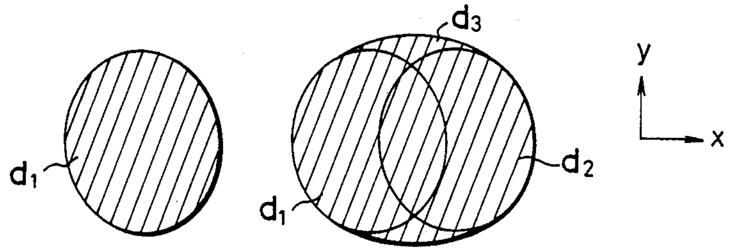
FIGS. 6*a* and 6*b* are views showing printed states of dots in the thermal head of the present invention.

As shown in FIG. **6*a*, elliptical formation of the dots is restrained by the limited shape of the slit 12 when the transferring operation is performed by the heating resistors 4 having the slit 12 formed in the above-mentioned shape, thereby obtaining a dot $d_1$ having a high circularity. As shown in FIG. 6*b***, when adjacent dots $d_1$ and $d_2$ are printed, temperature reduction is restrained between the dots $d_1$ and $d_2$ so that a blank portion and a portion having a low density are not caused in the dots when the entire dots are printed, thereby providing a preferable dot $d_3$ as a whole.

As mentioned above, in accordance with the present invention, circularity of the printed dots can be improved and image quality in printing operation can be thereby improved.

Many widely different embodiments of the present invention may be constructed without departing from the spirit and scope of the present invention. It should be understood that the present invention is not limited to the specific embodiments described in the specification, except as defined in the appended claims.

What is claimed is:

1. A thermal head arranged in a printing device so as to be opposite to a printed object fed in a constant direction, the thermal head comprising:

a base member;

a plurality of heating resistors arranged in said base member;

electrodes disposed in said base member corresponding to said heating resistors; and a slit formed on a surface of said heating resistors and having a shape in which the width of the slit in a feeding direction of said printed object is less than that in an arranging direction of said heating resistors perpendicular to said feeding direction and the width of the slit in the arranging direction of the heating resistors is approximately equal to a half length of a pitch of said heating resistors in said arranging direction thereof.

2. A thermal head as claimed in claim 1, wherein the accuracy in circularity of dots is improved by satisfying a condition that the width of the slit in the feeding direction of the printed object is less than that in the arranging direction of the heating resistors perpendicular to the feeding direction.

3. A thermal head as claimed in claim 2, wherein the generation of irregular density is restrained by satisfying a condition that the width of the slit in the direction perpendicular to the feeding direction of the printed object is approximately equal to the half length of the pitch of the heating resistors in this perpendicular direction.

* * * * *